United States Patent
Yen

(10) Patent No.: US 6,188,389 B1
(45) Date of Patent: Feb. 13, 2001

(54) THIRD AXIS INPUT DEVICE FOR A COMPUTER MOUSE

(75) Inventor: Tsu-Hsiang Yen, Taipei (TW)

(73) Assignee: Chic Technology Corp., Chungho (TW)

( * ) Notice: Under 35 U.S.C. 154(b), the term of this patent shall be extended for 0 days.

(21) Appl. No.: 09/209,251

(22) Filed: Dec. 10, 1998

(51) Int. Cl.$^7$ ..................................................... G09G 5/08
(52) U.S. Cl. ............................................................ 345/163
(58) Field of Search ..................................... 345/156, 163, 345/157; 341/20

(56) References Cited

U.S. PATENT DOCUMENTS

| | | | |
|---|---|---|---|
| 5,446,481 | * 8/1995 | Gillick et al. | 345/163 |
| 5,530,455 | * 6/1996 | Gillick et al. | 345/163 |
| 5,808,568 | * 9/1998 | Wu | 341/20 |
| 5,912,661 | * 6/1999 | Siddiqui | 345/166 |
| 5,917,473 | * 7/1999 | Yeh | 345/163 |
| 6,014,130 | * 12/1999 | Chou | 345/163 |

* cited by examiner

Primary Examiner—Amare Mengistu
(74) Attorney, Agent, or Firm—A & J

(57) ABSTRACT

A third axis input device for a computer mouse includes a fixed primary seat, a fixed secondary seat, a wheel, an annular ring-like grating member, a suspending member, and an idle roller, characterized in that: the fixed primary seat has a lower portion provided with a first fixed rod and a first L-shaped hook member adapted to engage with a printed circuit board, a recess between the fixed rod and the L-shaped hook member for receiving a photoelectric controller, two arms provided at two sides of the fixed primary seat for engaging with the fixed secondary seat, a vertical rod and a vertical lug extending upwardly from the top of the fixed primary seat, the fixed secondary seat including a second fixed rod and a second L-shaped hook member having the same structure as the first fixed rod and first L-shaped hook member at the bottom rear portion, a slot at the bottom for receiving a photoelectric controller, and a hole above the slot, whereby the third axis input device is durable in use, simple in construction and low in cost.

1 Claim, 3 Drawing Sheets

THIRD AXIS INPUT DEVICE FOR A COMPUTER MOUSE

BACKGROUND OF THE INVENTION

1. Field of the Invention

This invention is related to an improvement in the structure of a third axis input device for a computer.

2. Description of the Prior Art

Although the conventional third axis input devices for a computer mouse are of various kinds of structure, they apply the same working principle of the first and second axes and are operated either by the thumb or forefinger. However, the conventional third axis input devices are complicated in structre and easily damaged thereby increasing the manufacturing cost.

Therefore, it is an object of the present invention to provide an improvement in the structure of a third axis input device for a computer mouse which can obviate and mitigate the above-mentioned drawbacks.

SUMMARY OF THE INVENTION

This invention is related to an improvement in the structure of a third axis input device for a computer.

According to a preferred embodiment of the present invention, a third axis input device for a computer mouse includes a fixed primary seat, a fixed secondary seat, a wheel, an annular ring-like grating member, a suspending member, and an idle roller, characterized in that: the fixed primary seat has a lower portion provided with a first fixed rod and a first L-shaped hook member adapted to engage with a printed circuit board, a recess between the fixed rod and the L-shaped hook member for receiving a photoelectric controller, two arms provided at two sides of the fixed primary seat for engaging with the fixed secondary seat, a vertical rod and a vertical lug extending upwardly from the top of the fixed primary seat, the fixed secondary seat including a second fixed rod and a second L-shaped hook member having the same structure as the first fixed rod and first L-shaped hook member at the bottom rear portion, a slot at the bottom for receiving a photoelectric controller, and a hole above the slot.

It is the primary object of the present invention to provide an improvement in the structure of a third axis input device for a computer which is durable in use.

It is another object of the present invention to provide an improvement in the structure of a third axis input device for a computer which is simple in construction.

It is still another object of the present invention to provide an improvement in the structure of a third axis input device for a computer which is inexpensive to manufacture.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
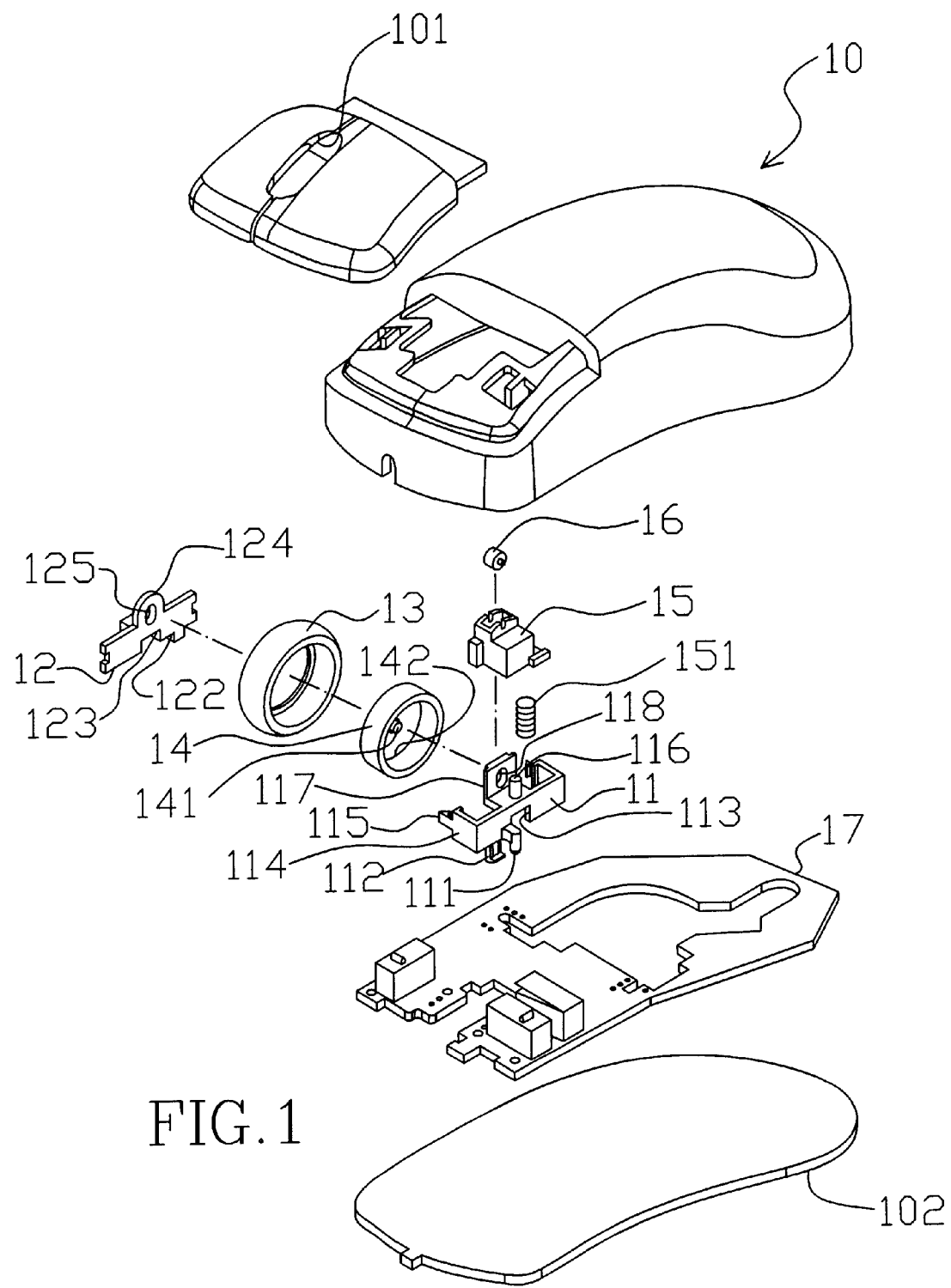
FIG. 1 is an exploded view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
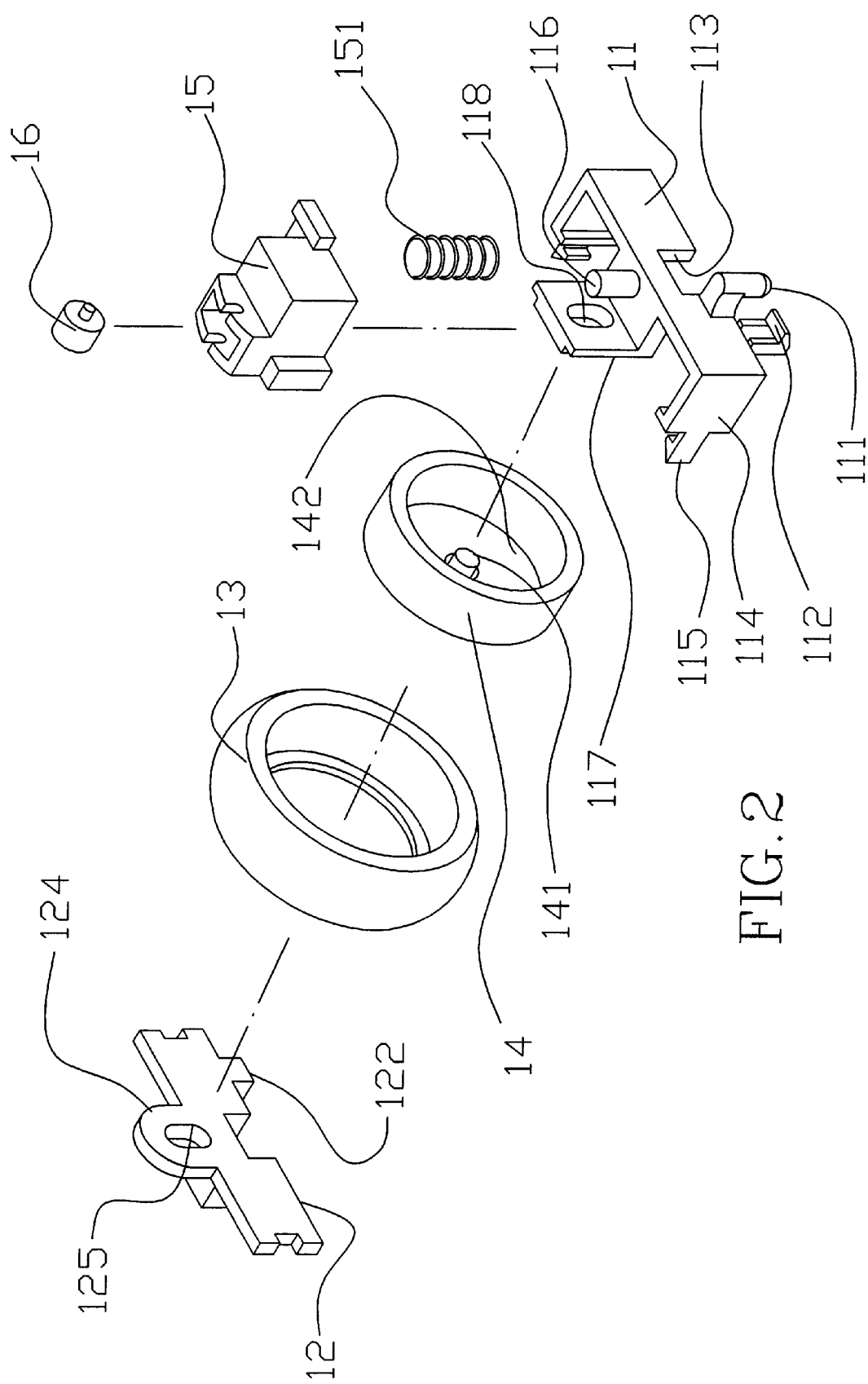
FIG. 2 is an enlarged fragmentary view of FIG. 1.
Figure 3:
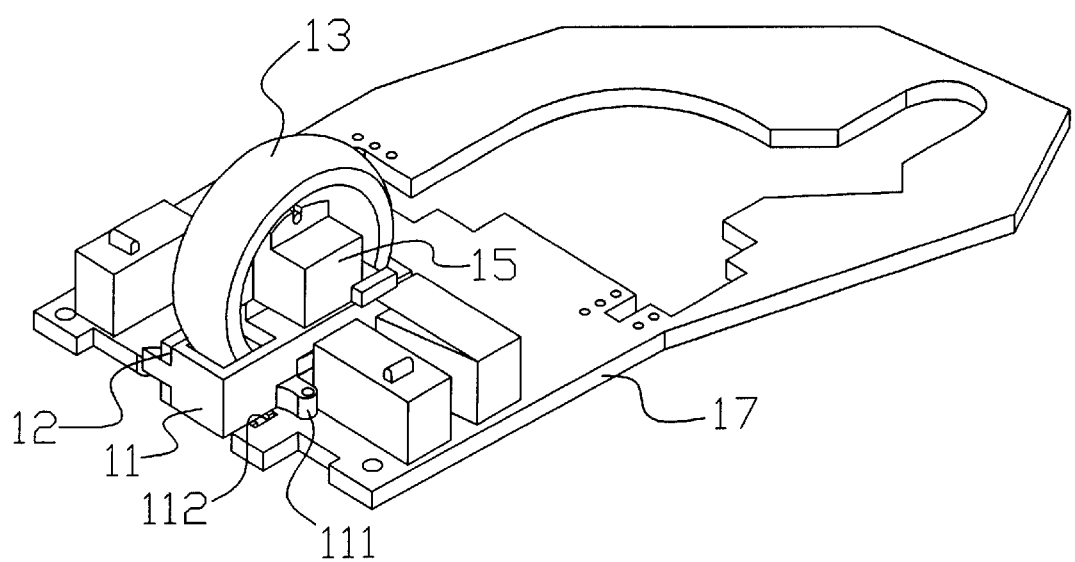
FIG. 3 is a perspective view of the present invention.

With reference to the drawings and in particular to FIGS. 1 and 2 thereof, the present invention comprises a housing 10 and a base plate 102 mounted on the bottom of the housing 10. The housing 10 is formed with a slot 101 for receiving a wheel 13. The first and second axes and the track ball (not shown) are well known in the art and not considered a part of the invention. As shown in FIGS. 1, 2 and 3, the present invention comprises a fixed primary seat 11, a fixed secondary seat 12, a wheel 13, an annular ring-like grating member 14, a suspending member 15 and an idle roller 16. The fixed primary seat 11 has a lower portion provided with a first fixed rod 111 and a first L-shaped hook member 112 adapted to engage with a printed circuit board 17, a recess 113 between the first fixed rod 111 and the first L-shaped hook member 112 for receiving a photoelectric controller, two arms 114 provided at two sides of the fixed primary seat 11 for engaging with the fixed secondary seat 12, a vertical rod 116 and a vertical lug 117 extending upwardly from the top of the fixed primary seat 11, and an opening 118 formed on the vertical lug 11. The fixed secondary seat 12 includes a second fixed rod 121 and a second L-shaped hook member 122 having the same structure as the first fixed rod 111 and first L-shaped hook member 112 at the bottom rear portion, a slot 123 at the bottom for receiving a photoelectric controller, and an upper portion 124 having a hole 125 above the slot 123. The wheel 12 is fitted on the annular ring-like grating member 14 for facilitating operation with a forefinger. The annular ring-like grating member 14 is provided with an axle 141 and a grating clearance (not shown) and held between the opening 118 of the primary fixed seat 11 and the hole 125 of the secondary fixed seat 12 so that the annular ring-like grating member 14 can be moved downwardly or rotated. The suspending member 15 is fitted over the vertical lug 117 of the fixed primary seat 11 and the vertical rod 116 enclosed with a helical spring 151 for urging the annular ring-like grating member 14 to go upwardly and turning off a power switch (not shown). The idle roller 16 is mounted on the top of the suspending member 15 for supporting the annular ring-like grating member 14 and enabling it to rotate steadily and smoothly.

described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A third axis input device for a computer mouse, comprising a fixed primary seat, a fixed secondary seat, a wheel, an annular ring-like grating member, a suspending member, and an idle roller, characterized in that:

said fixed primary seat has a lower portion provided with a first fixed rod and a first L-shaped hook member adapted to engage with a printed circuit board, a recess between said fixed rod and said L-shaped hook member for receiving a photoelectric controller, two arms provided at two sides of said fixed primary seat for engaging with said fixed secondary seat, a vertical rod and a vertical lug extending upwardly from the top of said fixed primary seat, said lug being formed with an opening;

said fixed secondary seat includes a second fixed rod and a second L-shaped hook member having the same structure as said first fixed rod and first L-shaped hook member at the bottom rear portion, a slot at the bottom for receiving a photoelectric controller, and a hole above said slot;

said wheel is fitted on said annular ring-like grating member for facilitating operation with a forefinger;

said annular ring-like grating member is provided with an axle and a grating clearance and held between said primary and secondary fixed seats so that said annular ring-like grating member can be moved downwardly or rotated;

said suspending member is fitted over said vertical lug and said vertical rod enclosed with a helical spring for urging said annular ring-like grating member to go upwardly and turning off a power switch; and said idle roller mounted on a top of said suspending member for supporting said annular ring-like grating member and enabling it to rotate steadily and smoothly.

* * * * *